3,481,915
1-OLEFIN POLYMERIZATION PROCESS AND CATALYST
Gerald R. Kahle and Lawrence M. Fodor, Bartlesville, Okla., assignors to Phillips Petroleum Company, a corporation of Delaware
No Drawing. Filed Mar. 7, 1966, Ser. No. 532,108
Int. Cl. C08f 1/32
U.S. Cl. 260—93.7        9 Claims

ABSTRACT OF THE DISCLOSURE

Flexural modulus of polyolefins is improved by carrying out the formation thereof with a catalyst system which forms on mixing (A) $R'_nAlX_{3-n}$
(B) $TiCl_3 \cdot \frac{1}{3}AlCl_3$ and
(C) a boron complex of the formula $R'_mM' \cdot BH_3$, or $Z \cdot BH_3$, wherein $R'$ is hydrogen or alkyl, cycloalkyl, aryl or combinations thereof having up to 20 carbon atoms, $M'$ is a Group Va element such as nitrogen, phosphorus, arsenic, antimony or bismuth, X is a halogen such as fluorine, chlorine, bromine or iodine $m$ is the valence of $M'$, $n$ is 2 or 3, and Z is a compound selected from pyridine, piperidine, picoline, quinoline, indole, and pyrrole.

---

This invention relates to the polymerization of olefins to form solid polymers. In one aspect it relates to an improved catalyst system for the polymerization of olefins. In another aspect it relates to a process for producing polymers of olefins having high modulus and low xylenes-soluble content.

It is known in the art to polymerize aliphatic 1-olefins such as propylene and 1-butene to form crystalline solid polymers. Catalysts for such a process are often formed by mixing together a compound having a metal-carbon bond with a compound of a transition metal. The activities of various of these catalysts can be improved by the addition of other compounds. Thus, for example, a catalyst which forms on the admixing of an alkylaluminum halide with a titanium halide can be improved by the addition to this mixture of a third component such as an organic phosphine. Still other components can be added to increase activity. Catalysts and processes of this type are disclosed in U.S. Patents 2,832,759 (1958) and 3,051,692 (1962). It is also known to produce crystalline polypropylene in high yields by the use of a catalyst which forms on mixing a dialkylaluminum chloride or iodide with a complex which forms on the reaction of titanium tetrachloride with metallic aluminum. This type catalyst and process are disclosed in British Patent 940,178.

Catalysts of the organometal type vary widely in activity and in the properties of the polymers which they produce. In the production of crystalline polypropylene, it is desirable to obtain not only high yields in the polymerization process but also a polymer which has a high flexural modulus.

An object of this invention is to provide an improved catalyst for the polymerization of olefins. Another object of this invention is to provide polyolefins having improved flexural modulus. Another object of this invention is to provide polyolefins having decreased xylenes-soluble content. A further object of this invention is to decrease the amount of noncrystalline polymer formed, as measured by decrease in xylenes-soluble material.

Other aspects, objects and the several advantages of this invention will become apparent to those skilled in the art upon consideration of the disclosure and the appended claims.

In accordance with this invention, we have discovered that the flexural modulus of polyolefins is improved and the xylenes-soluble content reduced by carrying out the formation of the polyolefins with a catalyst system formed on mixing (A) $R'_nAlX_{3-n}$
(B) $TiCl_3 \cdot \frac{1}{3}AlCl_3$ and
(C) a boron complex of the formula $R'_mM' \cdot BH_3$, or $Z \cdot BH_3$, wherein $R'$ is hydrogen or alkyl, cycloalkyl, aryl or combinations thereof having up to 20 carbon atoms, $M'$ is a Group Va element such as nitrogen, phosphorus, arsine, antimony or bismuth, X is a halogen such as fluorine, chlorine, bromine, or iodine, $m$ is the valence of $M'$, $n$ is 2 or 3, and Z is a compound selected from pyridine, piperidine, picoline, quinoline, indole, and pyrrole. The Periodic Table used is that published in Handbook of Chemistry and Physics, 45th edition, 1964, Chemical Rubber Company, p. B-2.

The binary catalyst system $TiCl_3 \cdot \frac{1}{3}AlCl_3$ and $R'_nAlX_{3-n}$ for the polymerization of 1-olefins such as propylene is well known. The titanium trichloride complex represented by the formula $TiCl_3 \cdot \frac{1}{3}AlCl_3$ is well known to the industry, and is usually prepared by reduction of $TiCl_4$ with aluminum.

Exemplary $R'_nAlX_{3-n}$ compounds for this binary system are diethylaluminum chloride, methylethylaluminum bromide, ethylaluminum sesquichloride, isobutyloctyl aluminum iodide, diisopropylaluminum fluoride, cyclopentylphenylaluminum chloride, 2-methylcyclopentylbenzylaluminum iodide, ditetradecylaluminum chloride, triethylaluminum, tri-n-butylaluminum, di(3-phenyl-1-methylpropyl)aluminum fluoride, aluminum hydride, chloroethylaluminum hydride, diethylaluminum hydride, triisobutylaluminum, and the like. Mixtures can be employed.

By the addition of a borane complex adjuvant in accordance with this invention to the binary system there results the production of polymers having improved properties.

The borane complexes can be prepared simply by reacting diborane ($B_2H_6$) with unsubstituted or hydrocarbon-substituted amines, phosphines, arsines, stibines or bismuthines, or with ethers, thioethers, selenoethers or telluroethers, or with a heterocyclic nitrogen compound. Examples of such complexes are ammonia-borane, t-butylamine-borane, triphenylphosphine-borane, tricyclopentylarsine-borane, dicyclohexylstibine-borane, ethylphenylbismuthine-borane, diethyl ether-borane, methyl phenyl thioether-borane, propyl cyclohexyl selenoether-borane, cyclopentylbenzyl telluroether-borane, trimethylamine-borane, eicosyl 1-naphthyl ether-borane, pyridine-borane, piperidine-borane, α-picoline-borane, γ-picoline-borane, quinoline-borane, isoquinoline-borane, pyrrole-borane, isopyrrole - borane, indole-borane, methylcyclohexylphenylstibine-borane, and the like.

The enumeration of alkyl, cycloalkyl and aryl radicals herein in defining the above formulas is intended to include the various mixed radicals such as alkaryl, aralkyl and the like.

In forming the foregoing catalyst, the molar ratio of the compounds of the formula $R'_nAlX_{3-n}$ to $TiCl_3 \cdot \frac{1}{3}AlCl_3$ is in the range of 0.5:1 to 10:1 and preferably 1:1 to 7.5:1. The molar ratio of borane complex $R_mM \cdot BH_3$, $R'_mM' \cdot BH_3$, or $Z \cdot BH_3$ to $TiCl_3 \cdot \frac{1}{3}AlCl_3$ is in the range of 0.01:1 to 5:1 and preferably 0.05:1 to 3:1.

The total catalyst concentration is usually within the range 0.005 to 10 weight percent of the olefin being polymerized, but concentrations outside this range are operative.

The polymerization reaction is carried out either in a mass system—i.e., the olefin being polymerized acts as reaction medium—or in an inert hydrocarbon diluent, such as a paraffin, cycloparaffin, or aromatic hydrocarbon having up to 20 carbon atoms per molecule. Examples of hydrocarbons that can be used are pentane, hexane, heptane, isooctane, eicosane, cyclohexane, methylclopentane, benzene, toluene, naphthalene, anthracene, and the like. Where an inert diluent is used, the volume ratio of diluent to olefin is in the range of 1:1 to 10:1, preferably 3:1 to 7:1.

The polymerization is conducted at temperatures in the range 80 to 250° F., preferably 100 to 200° F. The pressure can be sufficient to maintain the reaction mixture substantially in liquid phase, or—particularly in a mass system—can be such that the olefin is in the gas phase. The reaction time is in the range 10 minutes to 50 hours, more frequently 30 minutes to 25 hours.

Although the invention is illustrated by the polymerization of propylene, any aliphatic 1-olefin having up to 8 carbon atoms per molecule can be used. Preferably those having 3 to 7 carbon atoms are used, such as propylene, 1-butene, 1-hexene, 4-methyl-1-pentene, 1-heptene, and the like.

It is within the scope of the invention to use hydrogen in a concentration of about 0.08 to 1 mol percent of the 1-olefin for controlling the molecular weight of the polymer.

In the commercial production of polypropylene, it is desirable that the production of noncrystalline polymer, as measured by xylene-soluble content, be maintained at a low level. One advantage of this invention is that product polymer contains only small amounts of xylene-soluble material. The percentage of xylene-soluble material is determined by placing 0.95 gram of polymer in a 100-ml. centrifuge tube, adding 95 ml. of xylene, heating 15 minutes at 285° F., cooling, centrifuging, evaporating the solvent from a 25-ml. aliquot of the supernatant liquid, weighing the residue, and multiplying by 400.

The following example will serve to illustrate the invention, although it is not intended that the invention be limited thereto.

EXAMPLE I

Data illustrating the process of the invention were obtained by polymerizing propylene in a one-liter, stirred reactor in 2.5-hour runs at 130° F. and 325 p.s.i.g. with 250 grams of propylene and 1 liter of hydrogen (equivalent to 0.17 mol percent hydrogen in the liquid phase) present in the reaction system.

The following results were obtained:

TABLE I

| Run number: | Mol Ratio [a] $R'_nAlX_{3-n}$:Borane:$TiCl_3 \cdot \frac{1}{3} AlCl_3$ | Catalyst, wt. percent [b] | Flexural modulus, p.s.i.×$10^{-3}$ [c] | Xylenes soluble, wt. percent |
|---|---|---|---|---|
| 1 | 2:0:1 | 0.18 | 211 | 4.7 |
| 2 | 2:0.2:1 | 0.19 | 270 | 2.4 |
| 3 | 2:0.1:1 | 0.19 | 254 | 3.0 |

[a] $R_nAlX_{3-n}$ is diethylaluminum chloride. Borane is tert-butylamine-borane.
[b] Based on propylene.
[c] ASTM D 790-61.

The above data clearly demonstrate that addition of borane complex to the system results in an increase in flexural modulus and a decrease in xylenes-soluble content of the polymer produced when compared with the polymer produced in the absence of the borane complex.

EXAMPLE II

A series of runs were carried out polymerizing about 50 ml. (25 g.) of propylene dissolved in 250 ml. (158 g.) of pentane in 21.5 hour runs at 122° F. and about 65 p.s.i.g. with 0.34 mol percent added hydrogen, on the basis of the propylene.

The following results were obtained:

TABLE II

| Run number: | Mol Ratio [a] $R'_nAlX_{3-n}$:Borane:$TiCl_3 \cdot \frac{1}{3} AlCl_3$ | Catalyst, wt. percent [b] | Flexural modulus, p.s.i.×$10^{-3}$ [c] | Xylenes soluble, wt. percent |
|---|---|---|---|---|
| 1 | 2:0:1 | 0.91 | 229 | 5.2 |
| 2 | 2:0.2:1 | 0.94 | 253 | 3.4 |
| 3 | 2:0.1:1 | 0.93 | 267 | 3.3 |
| 4 | 2:0.2:1 | 0.94 | 257 | 2.3 |
| 5 | 2:0.1:1 | 0.92 | 268 | 3.0 |
| 6 | 2:0.2:1 | 0.95 | 260 | 3.2 |
| 7 | 2:0.1:1 | 0.93 | 255 | 3.2 |

[a] $R'_nAlX_{3-n}$ is diethylaluminum chloride. Borane is t-butylamine-borane in Runs 2 and 3, trimethylamine-borane in Runs 4 and 5, pyridine-borane in Runs 6 and 7.
[b] Based on propylene.
[c] ASTM D 790-61.

The above data clearly demonstrate that addition of borane complex to the system results in an increase in flexural modulus and a decrease in xylenes-soluble content of the polymer produced when compared with the polymer produced in the absence of the borane complex.

Reasonable variations and modifications can be made or followed, in view of the foregoing, without departing from the spirit and scope of this invention.

We claim:
1. A process which comprises polymerizing an aliphatic 1-olefin having up to 8 carbon atoms per molecule in the presence of a catalyst which forms on admixing (a) a compound of the formula $R'_nAlX_{3-n}$ wherein $R'$ is hydrogen or an alkyl, cycloalkyl or aryl group or a combination thereof having from 1 to 20 carbon atoms, X is a halogen and $n$ is 2 or 3; (b) a compound of the formula $TiCl_3 \cdot \frac{1}{3} AlCl_3$ and (c) a boron complex selected from those of the formulas $R'_mM' \cdot BH_3$ and $Z \cdot BH_3$ wherein $R'$ is hydrogen or an alkyl, cycloalkyl or aryl group or a combination thereof having from 1 to 20 carbon atoms, $M'$ is a group Va element, and Z is a compound selected from the group consisting of pyridine, piperidine, picoline, quinoline, indole and pyrrole and $m$ is the valence of $M'$ and wherein the molar ratio of the compounds of the formula $R'_nAlX_{3-n}$ to $TiCl_3 \cdot \frac{1}{3} AlCl_3$ is in the range of 0.5:1 to 10:1 and the molar ratio of said boron complex to $TiCl_3 \cdot \frac{1}{3} AlCl_3$ is in the range of 0.01:1 to 5:1.

2. A process according to claim 1 wherein said catalyst is formed on admixing diethylaluminum chloride, $TiCl_3 \cdot \frac{1}{3} AlCl_3$ tert-butylamine-borane.

3. A process according to claim 1 wherein said catalyst is formed on admixing diethylaluminum chloride,

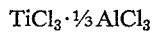

and pyridine-borane.

4. A process according to claim 1 wherein said catalyst is formed on admixing diethylaluminum chloride,

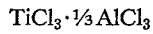

and trimethylamine-borane.

5. A process according to claim 1 wherein said aliphatic 1-olefin is propylene and the polymerization is carried out at a temperature in the range of 100° to 200° F.

6. A catalyst composition formed on admixing (a) a compound of the formula $R'_nAlX_{3-n}$ wherein $R'$ is hydrogen or an alkyl, cycloalkyl or aryl group or a combination thereof having from 1 to 20 carbon atoms, X is a halogen and $n$ is 2 or 3; (b) a compound of the formula $TiCl_3 \cdot \frac{1}{3} AlCl_3$ and (c) a boron complex selected from those of the formulas $R'_mM' \cdot BH_3$ and $Z \cdot BH_3$ wherein $R'$ is hydrogen or an alkyl, cycloalkyl or aryl group or a combination thereof having from 1 to 20 carbon atoms, $M'$ is a group Va element, and Z is a compound selected from the group consisting of pyridine, piperidine, picoline, quinoline, indole and pyrrole and $m$ is the valence of $M'$ and wherein the molar ratio of the compounds of the formula $R'_nAlX_{3-n}$ to $TiCl_3 \cdot \frac{1}{3} AlCl_3$ is in the range of 0.5:1 to 10:1 and the molar ratio of said boron complex to $TiCl_3 \cdot \frac{1}{3} AlCl_3$ is in the range of 0.01:1 to 5:1.

7. A catalyst according to claim 6 formed on admixing diethylaluminum chloride, $TiCl_3 \cdot \frac{1}{3} AlCl_3$, tert-butylamine-borane.

8. A catalyst according to claim 6 formed on admixing diethylaluminum chloride, $TiCl_3 \cdot \frac{1}{3} AlCl_3$ and pyridine-borane.

9. A catalyst according to claim 6 formed on admixing diethylaluminum chloride, $TiCl_3 \cdot \frac{1}{3} AlCl_3$ and trimethylamine borane.

References Cited
UNITED STATES PATENTS

| 3,328,378 | 6/1967 | Piekarski et al. | 260—94.9 |
| 3,340,241 | 9/1967 | Natta et al. | 260—93.7 |
| 3,310,547 | 3/1967 | Mirviss et al. | 260—93.7 |

JOSEPH L. SCHOFER, Primary Examiner

EDWARD J. SMITH, Assistant Examiner

U.S. Cl. X.R.

252—429; 260—94.9